Oct. 1, 1940.  E. G. BUSSE  2,216,338
RAILWAY BRAKE GEAR SUPPORT
Filed Dec. 12, 1938  3 Sheets-Sheet 1

INVENTOR
Edwin G. Busse
BY Rodney Bedell
ATTORNEY

Oct. 1, 1940.  E. G. BUSSE  2,216,338
RAILWAY BRAKE GEAR SUPPORT
Filed Dec. 12, 1938  3 Sheets-Sheet 2

INVENTOR
Edwin G. Busse
BY Rodney Bedell
ATTORNEY

Oct. 1, 1940.  E. G. BUSSE  2,216,338
RAILWAY BRAKE GEAR SUPPORT
Filed Dec. 12, 1938    3 Sheets-Sheet 3

INVENTOR
Edwin G. Busse
BY Rodney Bedell
ATTORNEY

Patented Oct. 1, 1940

2,216,338

UNITED STATES PATENT OFFICE 2,216,338

RAILWAY BRAKE GEAR SUPPORT

Edwin G. Busse, Chicago, Ill., assignor to Chicago Railway Equipment Company, Chicago, Ill., a corporation of Illinois Application December 12, 1938, Serial No. 245,175

15 Claims. (Cl. 188—210)

The invention relates to safety devices for railroad brake gear and consists in a support for underlying a brake beam or other brake part. Preferably the device guides and partially supports the beam in its movement to and from the wheel, and includes structure adapted to form the entire support for the device in the event of the failure of the brake hangers normally carrying the major portion of the weight of the brake beam.

The main object of the invention is to arrange supports of the general class referred to so they will yield under the thrust of the brake beam, as is desirable, particularly for guiding elements, and at the same time will avoid whipping action due to the movement of the support upwardly beyond its normal position when suddenly relieved of its load. Even if the device serves as a safety member only, and not as a guide, and therefore carries no weight normally, nevertheless the jolting of the truck produces a constant whipping action in the device tending to crystallize and break the same.

The present invention introduces a snubbing action between the parts of the device having as its object the prevention of the undesirable whipping actions referred to and thereby to prevent undue strains because of the repeated bending of the device in opposite directions.

Another object of the invention is to reduce or prevent vibration between brake beam gear guides or supports and their mountings tending to set up undesirable noises and in itself creating fatigue and failure of the metal.

These and other detail objects of the invention will be apparent from the following description, reference being had to the accompanying drawings in which—

Figure 1 is a top view of one end of a brake beam and showing adjacent portions of the wheel and the truck side-frame, and the safety device mounted on the side frame and constituting the main element of the present invention. The truck frame is sectioned approximately on the line 1—1 of Figure 2 and the beam hangers and the end of the truck bolster or transom are eliminated to simplify the disclosure and avoid confusion.

Figure 3:
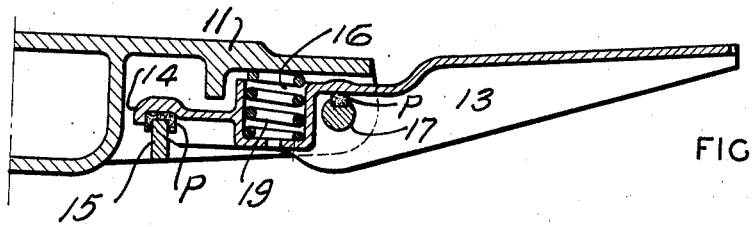
Figure 3 is a detailed vertical section on the line 3—3 of Figure 1.
Figure 4:
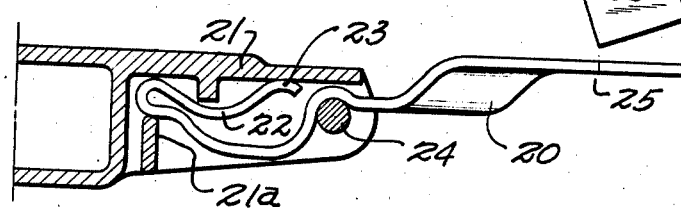
Figure 4 is a detailed section corresponding to Figure 3, but illustrating another form of the support arm and its assembly with the truck frame.
Figure 6:
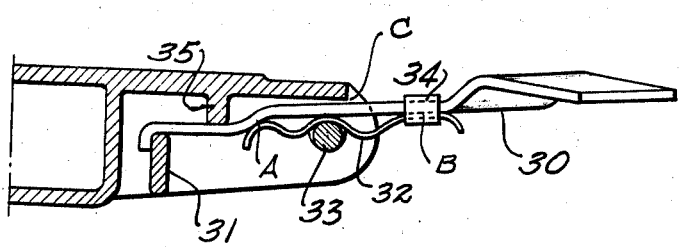
Figure 7:
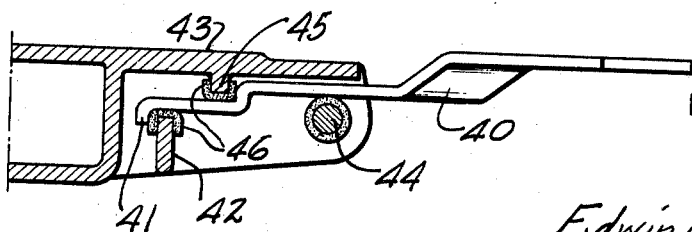

Figures 6 and 7 correspond to Figures 3 and 4, but illustrate other forms of support arms and their mounting on the truck side frame.

Figures 8, 9:
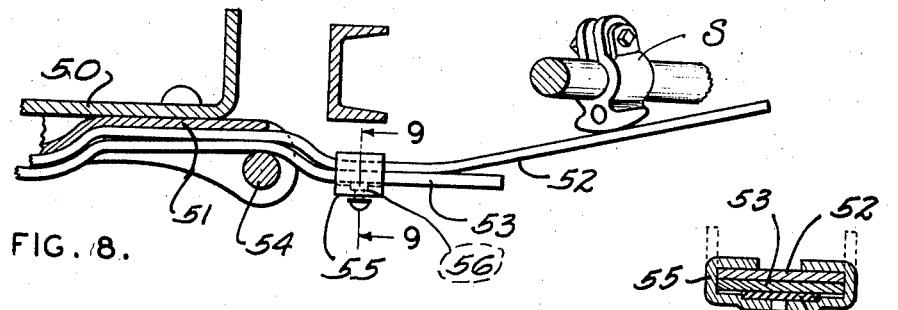

Figure 8 is a vertical section on a plane cutting longitudinally through a truck and illustrates another form of the invention.

Figure 9 is a detailed section taken on the line 9—9 of Figure 8.

Figure 10:
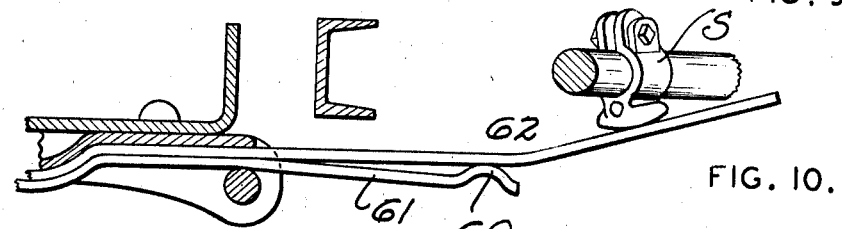
Figure 11:
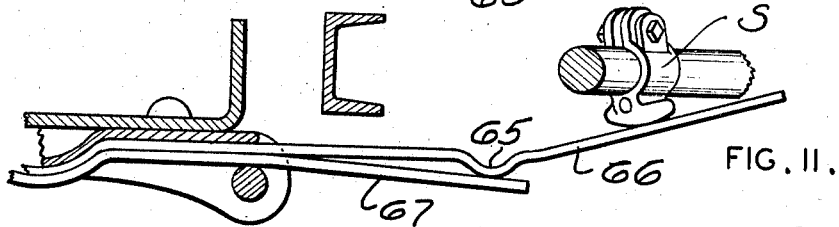
Figure 12:
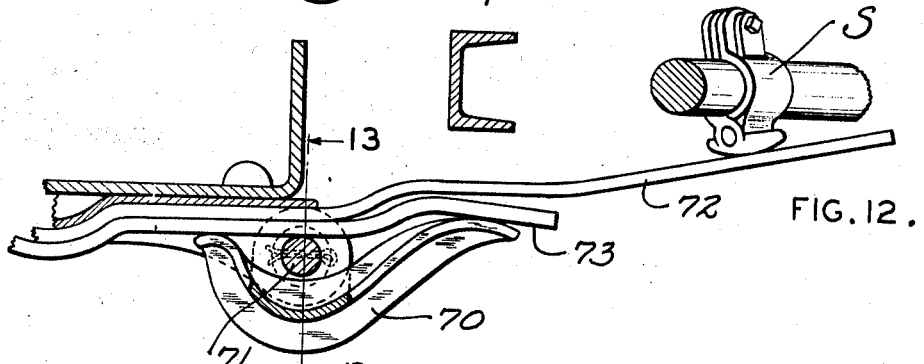

Figures 10, 11, and 12 correspond to Figure 8, but illustrate other forms of the invention.

Figure 13:
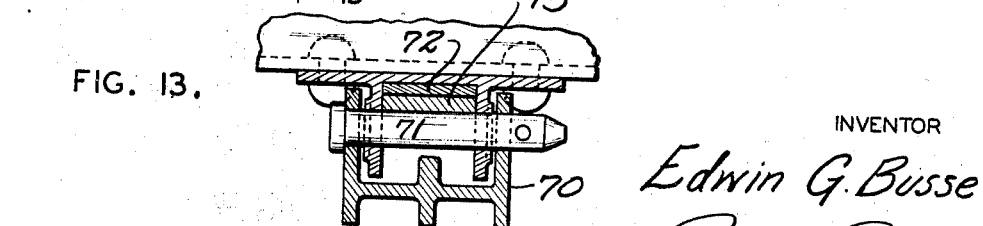

Figure 13 is a detailed vertical section taken on the line 13—13 of Figure 12.

Figure 1:
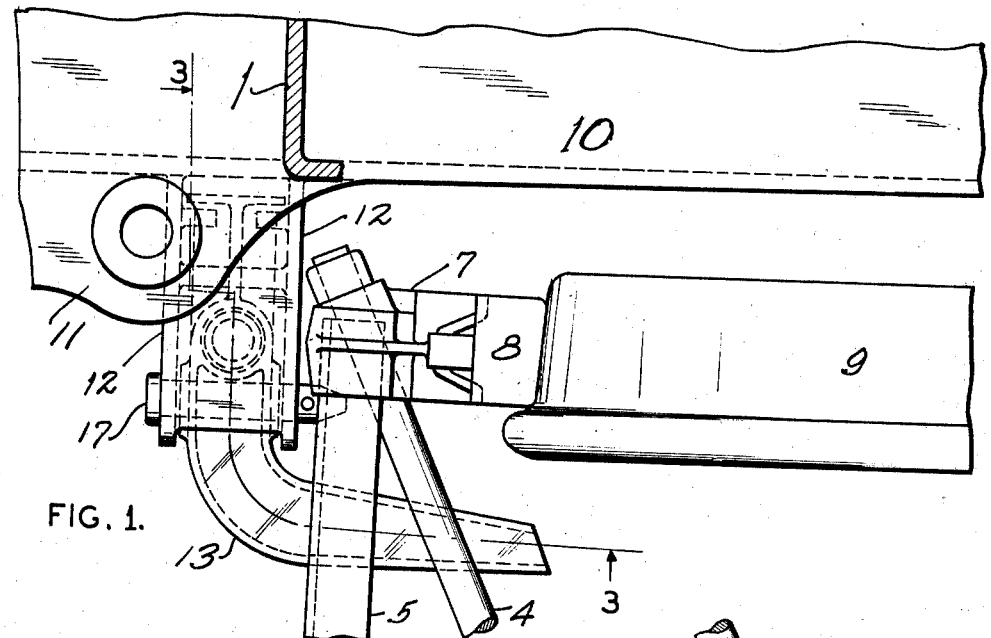
Figure 2:
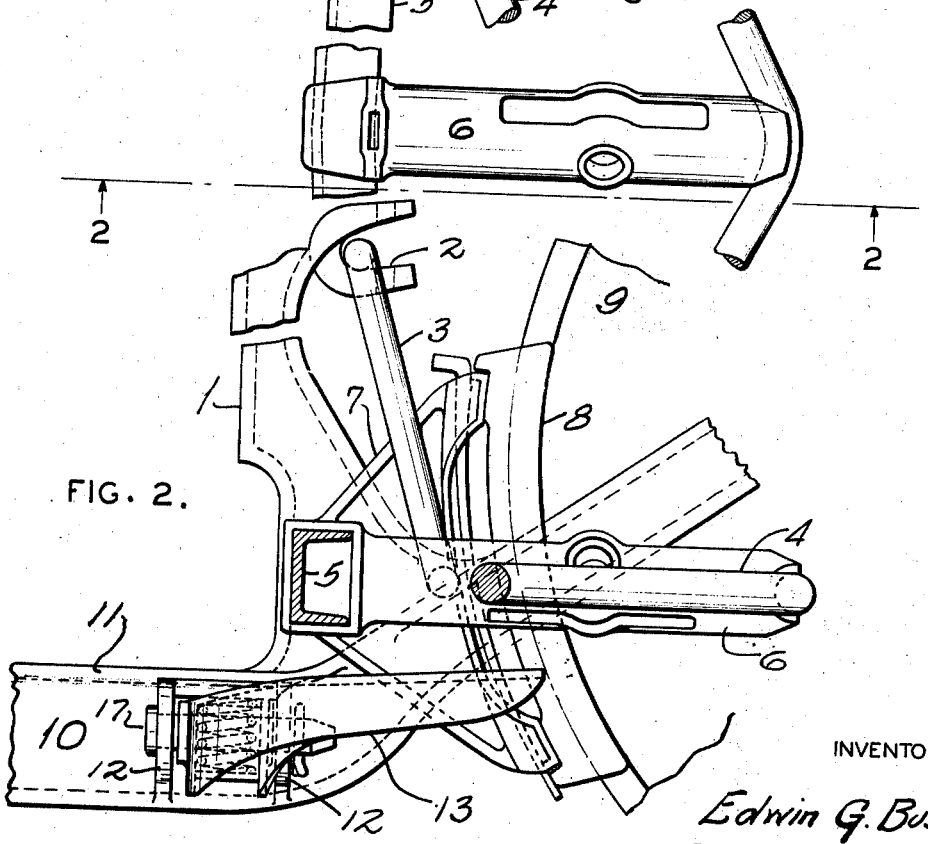
Figure 2 is a side elevation of the assembly shown in Figure 1, but the beam hanger and hanger bracket are also shown.

Figures 1 to 3 illustrate a familiar form of truck frame 1 including a bracket 2 for the brake hanger 3 supporting one end of the brake beam which comprises a tension member 4, a compression member 5, a strut 6, and a brake head 7 which mounts the shoe 8 arranged to be thrust against truck wheel 9.

The truck side frame is a one piece casting having a box section chord 10 with an integral web 11 extending inwardly from the frame and forming a seat for the truck spring (not shown). Depending flanges 12 reinforce the web and cooperate therewith to form a bracket which houses and mounts the inner end of a support arm 13 extending from the bracket inwardly of the truck and then longitudinally of the truck to underlie the brake beam.

Arm 13 is shown as a rigid casting or drop forging with a lip 14 at its inner end disposed to hook over a rib 15 on bracket 11 to anchor the arm in place. A securing pin 17 extends through flanges 12 and the arm includes a pocket 16 and a coil spring 19 compressed between the bottom of pocket 16 and the opposing face of web 11. Preferably rubber pads P cushion the contact between the arm and rib 15 and pin 17.

Obviously arm 13 may tilt about pin 17 and therefore forms a yielding support for the brake beam. Nevertheless spring 19 always resists tilting movement of the arm about either of elements 15 and 17 so there will be no tendency for the arm to whip upward from its normal position and flex its fibers or to pound on any of the bracket or brake beam parts.

Figure 5:
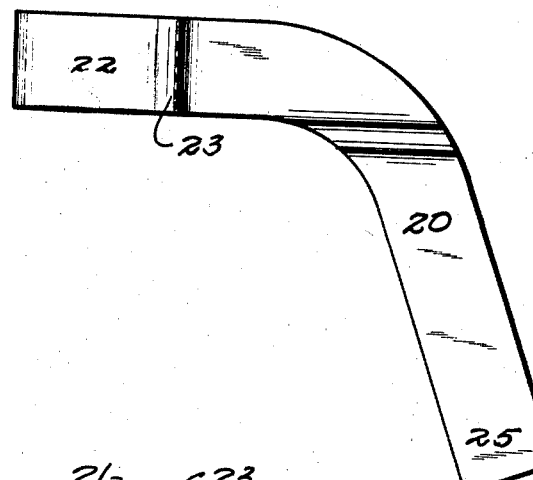
Figure 5 is a top view of the support arm shown in Figure 4.

Figures 4 and 5 illustrate a support arm 20 formed of flexible spring steel material and having a contour (viewed from above) corresponding to that of the support arm previously described. Arm 20 is mounted in a side frame bracket 21 similar to bracket 11—12, but the spring thrust on the support arm is furnished by doubling back a portion 22 of the arm so that its end 23 bears against the underside of bracket 21 thrusting the main portion of the arm against lugs 23 and pin 24.

Any tendency of the outer portion 25 of the arm to whip up and down due to the flexible nature of the arm and the length of the extension beyond the supporting pin 24 will be resisted by the resiliency of portion 22 which minimizes or eliminates pivotal action of the arm about pin 24 from its normal position and tends to dampen vibrations which otherwise would be set up in the arm.

In the arrangement shown in Figure 6, arm 30 has a contour (viewed from above) corresponding to arm 20 and may be formed of rigid or spring material. It is anchored at its inner end on lugs 31, and is supported at spaced points A and B by a spring element 32 carried on a pin 33 intermediate points A and B and seated in the bracket flanges. Preferably a clip 34 secures the outer end of spring 32 to arm 30. The rib 35 on the lower face of the mounting bracket prevents the upward movement of the inner end of arm 30. Clearance C accommodates flexing of arm 30, but any tendency of the arm to whip up and down is resisted by the thrust of spring 32 and by the friction between these elements when they move relative to each other.

Figure 7 illustrates a simple arrangement in which the arm 40, corresponding in top contour to the arms previously described, is anchored by its lip 41 to a supporting rib 42 on bracket 43, and is supported under the outer end of the bracket on a pin 44. The arm is held against rib 42 and pin 44 by a rib 45 on the underside of bracket 43. Rubber pads 46 are applied to ribs 42 and 45 and cooperate with the spring action of arm 40 to avoid vibration and to afford some flexibility in the anchorage. The arm 40 may be of rigid or spring material and any tendency of the same to whip back and forth will be resisted by the rubber mounting elements 46 and, if the arm is of spring material, by the initial distortion provided in the arm when it is assembled with the bracket.

Figures 8 and 9 illustrate a fourth point support and a safety device mounted on a truck spring plank 50 and positioned a substantial distance inwardly from the truck frame (not shown). The bracket 51, the flexible support arm 52, and the relatively stiff auxiliary support 53 correspond to structure previously used extensively, elements 52 and 53 being held in assembled position by a pin 54 extending through the flanges of bracket 51.

A clip 55 fits around adjacent portions of elements 52 and 53 to hold element 52 against movement away from element 53 and to insure frictional contact between these two elements as arm 52 moves downwardly and upwardly.

A rubber pad 56 may be inserted between the clip and the face of the support to absorb vibration and to increase the friction which dampens the whipping action of the support arm 52.

Figure 10 illustrates a support arm and mounting similar to that shown in Figure 8, but the anti-whipping arm frictional dampening structure is provided by a crimp 60 in the outer end of the auxiliary support 61, the crimp engaging support arm 62. It will be understood that there is a spring distortion between element 62 and the outer end of element 61 which dampens the spring action of element 62 and prevents the whipping of the same or of the outer end of element 61.

Figure 11 illustrates a modification of the structure just described in which a crimp 65 is provided in the support arm 66 instead of in the auxiliary support 67, but otherwise the construction and function is the same as described above.

Figures 12 and 13 illustrate another form of the invention in which a compensating lever 70 is pivoted intermediate its ends on the pin 71 which holds support arm 72 and auxiliary support 73 in position.

If the jarring of the truck or the application and release of the brakes or any other force tends to oscillate the portions of elements 72 and 73 at the right of pin 71, their movement upwardly from the normal position shown in Figure 12 will be accompanied by a proportionate downward movement of the portions of those elements at the left of pin 71 which, in turn, will impart movement to lever 70 and its outer end will rise and check the return movement of bars 72 and 73. In other words, the action of the parts of elements 72 and 73 at opposite sides of pin 71 will be opposed to each other by lever 70 at points spaced from the supporting pin 71 which anchors the bars to the spring bracket on the spring plank.

Lever 70 also acts to reinforce elements 72 and 73 when the latter are deflected and to form a rigid support for the same outwardly of pin 71 thereby contributing to the safety feature functioning in the event brake hanger fails.

Figures 8, 10, 11 and 12 show a fourth point support chair S applied to the tension member of the beam. This chair is well known in the art and, in itself, does not constitute part of the present invention but it illustrates one way in which load is applied to the support arm. If this chair is lost or is not replaced when the beam or parts of the assembly are repaired or renewed the outer end of the support arm is free of direct restraint and the tendency of whipping action, independent of alternate loading and releasing is increased and the functioning of the snubbing devices is even more important than when the support arms are under constant load.

Each of the arrangements described attains the general object set forth in the introductory part of this specification by yieldingly checking or snubbing the upward action of the support arm irrespective of the downward thrust thereon and this snubbing action is effected at a point spaced from the part of the support anchored or secured to the carrier bracket. Consequently the fiber strain will be reduced or eliminated even under most severe conditions.

The disclosures herein will enable those skilled in the art to devise numerous other forms of the invention and the exclusive use of those modifications coming within the scope of the claims is contemplated.

What is claimed is:

1. In a railway brake gear support device, an arm arranged to underlie a portion of the brake gear and to yield under thrust therefrom, and a carrier upon which said arm is mounted including an element for limiting the yielding movement of said arm, there being means for yieldingly snubbing movement of said arm away from said element.

2. In a railway brake gear support structure, a carrier member positioned beyond the end of the brake beam, an arm extending outwardly from said carrier member and then transversely of and beneath the brake beam, there being means yieldingly resisting movement of the inner end of said arm from its normal position under the thrust of the brake beam and upon return movement.

3. In a railway brake beam support structure, a carrier member positioned beyond the end of the brake beam, a rigid arm extending outwardly from said carrier member and then transversely of and beneath the brake beam, rigid elements on said carrier member for supporting said arm, and spring means yieldingly holding said arm against said elements.

4. In a railway brake beam support structure, a carrier member positioned beyond the end of the brake beam, a rigid arm extending outwardly from said carrier member and then transversely of and beneath the brake beam, rigid elements on said carrier member spaced longitudinally of said arm for supporting the same, and a spring compressed between said carrier member and the top of said arm and positioned intermediate said elements to yieldingly hold said arm against said elements.

5. In a railway truck, a side frame forming a bracket including upwardly and downwardly facing parts opposing each other, a brake gear support member having an end portion between said opposing parts and carried on at least one of said parts and extending outwardly from said bracket to underlie a part of the truck brake gear, there being spring structure seated against the other of said parts and holding said member to its said carrier part.

6. In a railway truck, a side frame bracket including a top part and spaced apart elements spaced below said part, a brake gear support member carried on said elements, a spring compressed between said member and said part intermediate said elements whereby said member may tilt on either one of said elements by the distortion of said spring.

7. In a railway truck, a side frame bracket including a shelf with depending flanges and a bar extending between said flanges and spaced from said shelf, a removable pin extending through said flanges and spaced from said bar and shelf, an arm with one end resting on said bar and extending therefrom over said pin and outwardly from said bracket to underlie a brake gear part, and a spring compressed between said arm and the bottom of said shelf and yieldingly resisting tilting of said arm about said bar or pin.

8. A brake gear support member including spaced parts for resting on carrier elements and having a cup-like pocket between said parts for receiving a spring projecting beyond said pocket transversely of the length of said member.

9. In a railway brake gear support device, a yielding support arm arranged to underlie a portion of the brake gear, a member for reinforcing said arm when abnormal load is applied thereto, and a part engaging said arm and member to yieldingly resist their relative movement to snub the rebound action of said member, said part comprising a clip surrounding said arm and member and having a rubber-like pad engaging one of the surrounded elements.

10. In a railway brake gear support device, a yielding arm with an end part arranged to underlie a portion of the brake gear, a member extending substantially parallel with and beneath said arm for reinforcing the latter when it is depressed, said arm and member being anchored at a point spaced from said end part and spaced apart substantially throughout their length outwardly of said anchorage, there being means providing frictional contact between restricted elements on said arm and member at a point spaced from said point of anchorage to snub the rebound action of said arm after being relieved of a depressing force.

11. In a railway brake gear support device, a yielding arm with an end part arranged to underlie a portion of the brake gear, a member extending substantially parallel with and beneath said arm for reinforcing the latter when it is depressed, said arm and member being anchored at a point spaced from said end part, a clip embracing said arm and member at a point spaced from their anchorage to provide snubbing action resisting the whipping action of said arm about its parallel position, said arm and member being spaced apart at each side of said clip.

12. In a railway truck, a spring plank, a bar of spring material carried by said spring plank and extending therefrom to underlie a brake beam, a relatively short auxiliary bar of spring material carried by said spring plank and extending under said first mentioned bar, a clip enclosing said bars at a point spaced from said spring plank to provide increased friction between said bars when they are distorted, said clip having a rubber-like pad compressed between a side of said clip and the opposing bar frictionally holding the clip wherever it may be placed along said bars.

13. In a brake gear support device, a carrier bracket, a support arm of yielding material extending outwardly from said bracket, a pin underlying said arm to secure it to said bracket, and a lever-like member pivoted about said pin with elements spaced from said pin and thrusting against said arm to snub it against whipping action about its normal position.

14. In a brake gear support device, a carrier bracket, a brake gear support arm of yielding material seated in said bracket, a reinforcing arm of yielding material underlying said first mentioned arm, a pin extending under said reinforcing arm and supporting both of said arms, and a lever-like member pivoted on said pin with its ends at opposite sides of said pin engaging the lower face of said reinforcing arm whereby distortion of a part of said arms at one side of said pin is resisted through said lever by the part of said arms at the other side of said pin.

15. In a device of the class described, a member arranged at one end for yieldingly supporting a brake gear part, a carrier to which another part of said member is anchored, and means having restricted and yielding engagement with said member at a point spaced from said end and part but accommodating flexing of said member at opposite sides of said means, said carrier and means being constructed and arranged to yieldingly resist whipping action of said member from its normal position.

EDWIN G. BUSSE.